June 2, 1964     M. OLYPHANT, JR     3,135,344
TARE POISE WITH FINE ADJUSTMENT
Filed Nov. 27, 1961
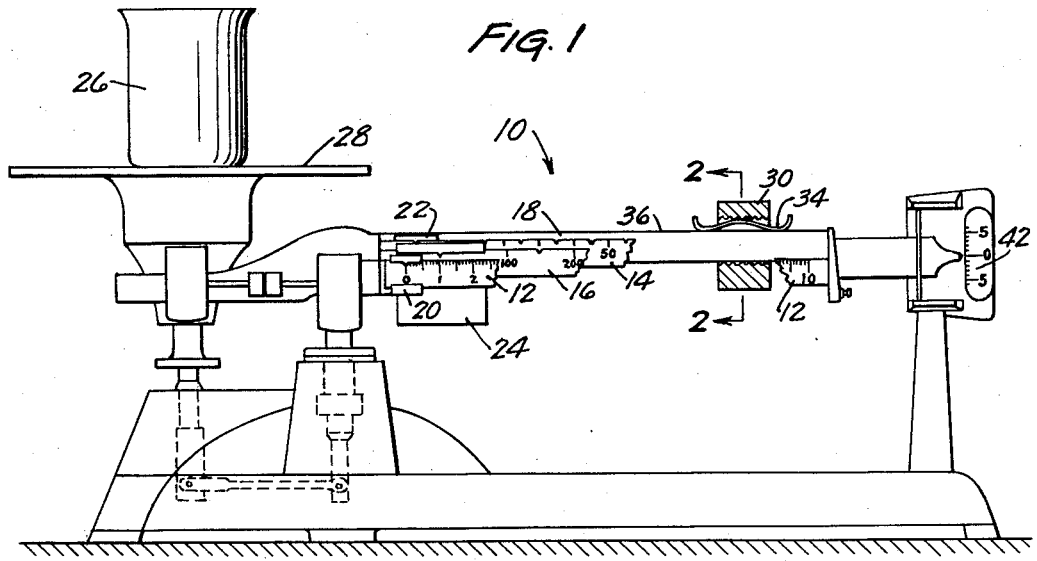
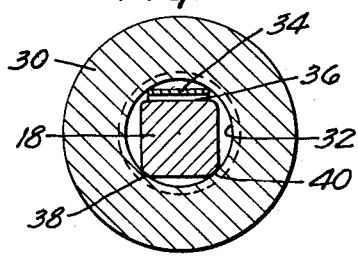
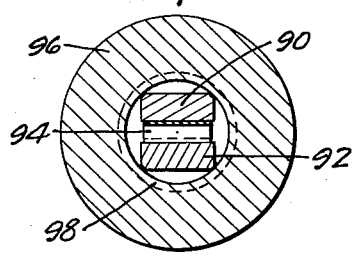
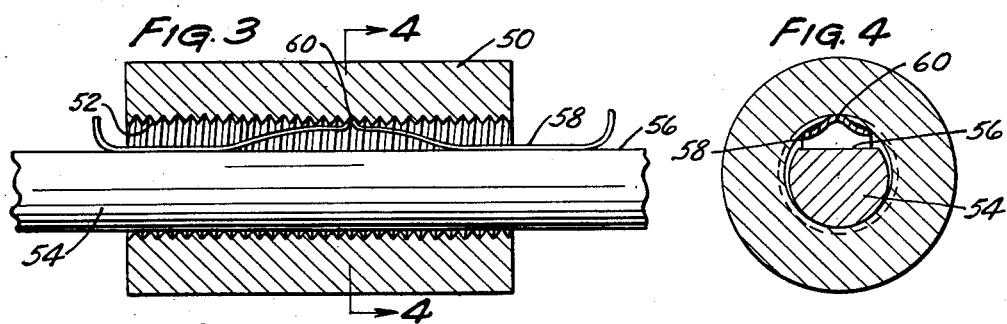
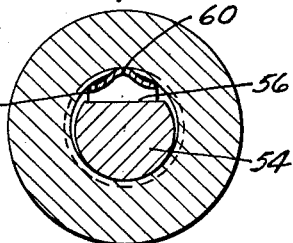
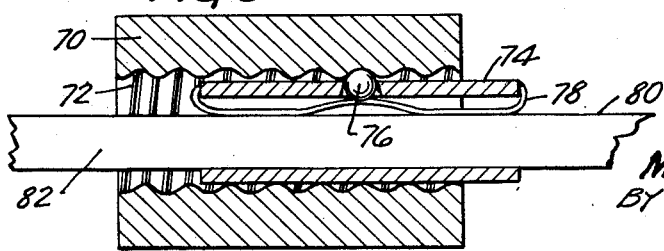
INVENTOR
MURRAY OLYPHANT, JR.
BY Robert E. Normand
ATTORNEY United States Patent Office 3,135,344
Patented June 2, 1964

3,135,344
TARE POISE WITH FINE ADJUSTMENT
Murray Olyphant, Jr., East Oakdale Township, Washington County, Minn. (4000 Hidden Bay Road, St. Paul 9, Minn.), assignor of one-half to Robert E. Granrud, St. Paul, Minn.
Filed Nov. 27, 1961, Ser. No. 155,054
8 Claims. (Cl. 177—246)

This invention relates to improved means for positioning a poise on a horizontal beam of a balance and primarily concerns a novel tare poise device for multiple beam balances.

For convenience in weighing materials in containers, a balance may have a horizontal beam which carries a tare poise. A widely used balance of this type employs a cylindrical tare poise having a smooth central bore for reception of the beam, which is smooth and formed with a flat longitudinal surface. A flat spring is positioned within said bore and bears in compression against said flat surface to maintain the poise in slidable frictional engagement with the beam. The spring is designed to move with the poise as the poise is slidably repositioned along the beam and to exert sufficient force to restrain the poise against movement during weighing operations. The chief disadvantage of such tare poise arrangement lies in the difficulty of exact adjustment, since it is often necessary to move the poise back and forth several times, each time waiting for the indicator needle of the balance to reach equilibrium.

A typical triple beam balance may include a fourth beam with a tare poise of 180 grams. Then, to counterbalance containers heavier than 180 grams, it is necessary to employ attachment weights, although many users consider attachments to be such a nuisance that they prefer to weigh the container directly. For this reason, some balances have heavier tare poises, but the heavier the tare poise, the more difficult it is to adjust.

I have now devised a novel tare poise device for quick and precise counterbalancing of tare weights which is particularly adapted to multiple beam balances such as that described above. Modification of such prior art balances to incorporate my invention is convenient and inexpensive. With modification in accordance with the principles of my invention, the tare poise device has the feature of slidable rough adjustment of the prior art and additionally includes means for advancing the poise along the beam in controlled fine adjustment when the poise is simply rotated. For example, in the prior-art balance described above in which the beam for the tare poise has a flat longitudinal surface and a flat spring is positioned in compression within the bore of the poise and bearing against said surface, the central bore of the poise may be threaded so that the threads of the bore engage both the spring and the surface of the beam obverse to said flat longitudinal bearing surface. This enables the poise to be slidably repositioned for rough adjustment in the same manner as with the unmodified device of the prior art; but for fine adjustment, the poise is simply rotated. That is, when the poise is simply rotated, the spring remains in place by virtue of its compression which also forces the threads of the poise bore against the obverse beam surface so that the poise advances through precise, limited distances due to engagement of its threads with the spring and with said obverse beam surface.

My invention may be applied not only to the above-described multiple beam balance but to any balance having a smooth uniform nonrotating horizontal beam formed with a smooth longitudinal bearing surface permitting rough adjustment of the poise simply by sliding the poise along the beam and fine screw-threaded adjustment of the poise simply by rotating the poise. Various embodiments of my invention are illustrated in the drawing in which:

FIG. 1 is a schematic illustration in elevation of a multiple beam balance embodying certain preferred features of my invention, the balance being cut away to a central section at the tare poise;

FIG. 2 is an enlarged cross-section along line 2—2 of FIG. 1;

FIG. 3 is a schematic fragmentary central section taken longitudinally through another tare poise arrangement embodying my invention;

FIG. 4 is a cross-section along line 4—4 of FIG. 3;

FIG. 5 is a schematic fragmentary central section taken longitudinally through a further tare poise arrangement of my invention; and FIG. 6 is a schematic central section taken transversely through the poise of another preferred tare poise arrangement which is exemplary of my invention.

Referring first to FIG. 1, a conventional triple beam balance 10 is illustrated schematically in front elevation with the units, tens and hundreds beams 12, 14 and 16 cut away to show the undivided tare beam 18. The poise 20 on the units beam 12, the poise 22 on the tens beam 14, and the poise 24 on the hundreds beam 16 are shown at their zero marks. An empty container 26 standing on the weighing platform 28 is counter-balanced by the tare poise 30.

As is better illustrated in FIG. 2, the tare beam 18 is formed with flat squared sides and smooth rounded edges. The tare poise 30 is a hard brass cylinder having a continuously threaded central bore 32 for reception of the tare beam. A flat spring 34 of beryllium copper is formed with smooth surfaces and edges and is positioned in compression between the bore 32 and the upper surface 36 of the tare beam 18 so that the threads of the poise bore 32 bear against the spring 34 and against the two rounded edges 38 and 40 of the beam 18 obverse to the surface 36. The spring 34 is formed with upturned ends of sufficient height to prevent the poise 30 from passing over the ends of the spring so that the spring always slides with the poise. After sliding movement of the poise, the spring 34 may be re-centered with the fingers, or the sliding movement may so position the poise that it is rotated toward the protruding end of the spring in making the fine adjustment.

Preferably the pitch of the thread of the bore 32 is such that one-eighth of a turn of the poise equals one unit of the needle scale 42, and the poise may be marked with calibrations to indicate units of needle scale. Thus, with a little practice, there is no difficulty in exactly counterbalancing any tare weight with one rough adjustment by sliding the tare poise longitudinally and with one or two fine adjustments by simply rotating the poise. Because precise adjustment is so quick and easy, the tare poise 30 may be substantially heavier than in tare poise arrangements of the prior art where final adjustment had to be made by sliding the poise back and forth on the beam.

Another tare beam and poise arrangement embodying the principles of my invention is illustrated by the fragmentary central section of FIG. 3. Here, a cylindrical poise 50 has a continuously threaded central bore 52 for reception of a tare beam 54. As shown in the cross-sectional view of FIG. 4, the tare beam 54 is cylindrical except for a flat bearing surface 56 extending longitudinally over its full length. A flat spring 58 is positioned in compression between the threaded poise bore 52 and the flat bearing surface 56 so that the threads of the bore 52 engage both the spring 58 and the cylindrical portion of the tare beam 54 obverse to the flat surface 56. The flat spring 58 is formed with a detent or cusp 60 which meshes with the threads of the bore 52 so that the spring 58 slides with the poise 50 when it is slid along the tare beam 54. Accordingly, the spring 58 need not have upturned ends, but these ensure against loss of the spring and also make it easier to re-center with the fingers.

Instead of forming a flat spring with one or more cusps as illustrated in FIGS. 3 and 4, the same effect may be achieved if the spring has a serrated edge or edges to provide teeth or detents spaced to mesh with the threads of the poise bore.

Referring now to FIG. 5 which illustrates another tare poise arrangement of my invention, the tare poise 70 has a continuously threaded central bore 72 within which is positioned a cylindrical sleeve 74 having a ball-and-socket 76. A flat spring 78 is positioned in compression between the upper surface 80 of the tare beam 82 and the ball of the ball-and-socket 76. The ball thus meshes with the thread of the poise bore 72 so that the sleeve 74 is carried with the poise 70 when it is slid along the beam 82 for rough adjustment. Preferably the thread of the poise bore 72 is rounded as shown to permit quick re-centering of the sleeve 74.

The beam surface 80 against which the spring 78 bears is preferably flat or otherwise discontinuous with the rest of the surface of the beam 82 so that the spring 78 cannot rotate with the poise 70. Accordingly, the poise 70 when simply rotated advances short precise distances to provide easy fine adjustment in counterbalancing tare weights.

In the tare poise arrangement illustrated in FIG. 6, the beam consists of upper and lower halves 90 and 92 separated by a flat spring 94 which is formed with horizontal undulations extending the full length of the beam. The beam halves 90 and 92 are loosely bolted together at the extremities to compress the spring 94 uniformly over its length. A cylindrical poise 96 carried by the beam has a continuously threaded central bore 98 so that the poise is maintained in slidable frictional engagement with the beam halves 90 and 92 for rough adjustment but when simply rotated advances in screw-threaded fashion for fine adjustment.

A variant of the tare poise arrangement of FIG. 6 would utilize a whole cylindrical beam with a split poise having a threaded central bore slightly smaller in circumference than the beam, with the necessary spring action provided by a sleeve or clamps around the poise halves.

I claim:

1. A balance having a smooth uniform nonrotating horizontal beam formed with a smooth longitudinal bearing surface, a poise rotatably mounted on said beam, said poise having a central bore for reception of said beam, spring means for maintaining the poise in slidable frictional engagement with said longitudinal bearing surface for rough adjustment, and means for advancing said poise along said beam for fine adjustment when the poise is simply rotated.

2. A balance having a smooth nonrotating horizontal beam of uniform noncircular cross-section and formed with a smooth longitudinal bearing surface, a poise rotatably mounted on said beam, said poise having a continuously threaded central bore for reception of said beam, a spring positioned in compression between said bore and said bearing surface for maintaining the poise in slidable frictional engagement with said bearing surface for rough adjustment, and the thread of the bore engaging said spring and the surface of the beam obverse to said smooth bearing surface for advancing the poise in fine adjustment along the beam when the poise is simply rotated.

3. A balance having a smooth uniform nonrotating horizontal beam formed with a flat longitudinal bearing surface, a cylindrical poise rotatably mounted on said beam, said poise having a continuously threaded central bore for reception of said beam, a flat spring positioned in compression between said bore and said flat bearing surface for maintaining the poise in slidable frictional engagement with said bearing surface for rough adjustment, and the thread of the bore engaging said spring and the surface of the beam obverse to said flat bearing surface for advancing the poise in fine adjustment along the beam when the poise is simply rotated.

4. A balance having a nonrotating horizontal beam formed with flat squared sides and smooth rounded edges, a cylindrical poise rotatably mounted on said beam, said poise having a continuously threaded central bore for reception of said beam, a flat spring positioned in compression between said bore and one of the flat sides of the beam for maintaining the poise in slidable frictional engagement with said one flat side of the beam for rough adjustment, and the thread of the bore engaging said spring and the rounded edges of the beam diametrically opposite said one flat side for advancing the poise in fine adjustment along the beam when the poise is simply rotated.

5. A balance as defined in claim 3 wherein said flat spring is formed with smooth surfaces and edges, is of substantially greater length than is the bore of the poise, and is formed with upturned ends of sufficient height to prevent the poise from passing over the ends of the spring.

6. A balance as defined in claim 3 wherein said flat spring is formed with at least one detent which meshes with the threads of the bore.

7. A balance having a smooth uniform nonrotating horizontal beam formed with a smooth longitudinal bearing surface, said beam comprising two halves spit longitudinally, a spring maintained in compression between the beam halves, a poise having a continuously threaded central bore positioned on said beam in slidable frictional engagement with said bearing surface for rough adjustment, and the thread of the bore engaging said bearing surface for advancing the poise in fine adjustment along the beam when the poise is simply rotated.

8. A balance having a smooth uniform nonrotating horizontal beam formed with a flat longitudinal bearing surface, a cylindrical poise rotatably mounted on said beam, said poise having a continuously threaded central bore for reception of said beam, a flat spring of substantially greater length than is the bore of the poise and formed with upturned ends of sufficient height to prevent the poise from passing over the ends of the spring, said spring being positioned in compression between said bore and said flat bearing surface for maintaining the poise in slidable frictional engagement with said bearing surface for rough adjustment, said flat spring being formed with a single cusp intermediate its ends, the thread of the bore engaging said cusp and the surface of the beam obverse to said flat bearing surface for advancing the poise in fine adjustment along the beam when the poise is simply rotated.

References Cited in the file of this patent

UNITED STATES PATENTS

| 158,636 | Goodwin | Jan. 12, 1875 |
| 2,013,934 | Waltz | Sept. 10, 1935 |
| 2,496,448 | Dunlavey | Feb. 7, 1950 |
| 2,668,476 | Isom | Feb. 9, 1954 |

FOREIGN PATENTS

| 7,536 | Great Britain | Mar. 31, 1904 |
| 22,337 | Germany | May 21, 1883 |
| 135,892 | Great Britain | Dec. 1, 1919 |